United States Patent [19]

Langner et al.

[11] Patent Number: 4,843,713

[45] Date of Patent: Jul. 4, 1989

[54] APPARATUS FOR MAKING HELICAL FLOWLINE BUNDLES

[75] Inventors: Carl G. Langner, Spring; Joe O. Esparza, Katy, both of Tex.

[73] Assignee: Shell Oil Company, Houston, Tex.

[21] Appl. No.: 267,760

[22] Filed: Nov. 1, 1988

Related U.S. Application Data

[63] Continuation of Ser. No. 889,456, Jul. 25, 1986, abandoned.

[51] Int. Cl.4 .............................................. B23P 19/00
[52] U.S. Cl. ...................................... 29/799; 29/469; 57/6
[58] Field of Search ................... 29/469, 799; 57/3, 6, 57/9, 12, 138, 311

[56] References Cited

U.S. PATENT DOCUMENTS

| | | | |
|---|---|---|---|
| 2,724,944 | 11/1955 | Carleton et al. | 57/138 X |
| 3,106,815 | 10/1963 | Nance et al. | 57/138 X |
| 3,128,799 | 4/1964 | Uerr | 57/138 X |
| 4,529,334 | 7/1985 | Ortloff | 405/195 |
| 4,530,205 | 7/1985 | Seiler et al. | 57/311 X |

FOREIGN PATENT DOCUMENTS 676224 7/1952 United Kingdom ................ 36A/99

OTHER PUBLICATIONS

"Bundles Offer Reel Advantages", Offshore Engineer, Mar. 1986, pp. 38–40.
Brochure from Kvarner Subsea Contracting A/S, May 2, 1986, covering prototype test.
Report, "A New Multiple Flow- and Control Line Bundle", published by Kvaerner Subsea Contracting A/S.
"Thriving R&D Yields New Technology and Products", Ocean Industry, Apr. 1986.

Primary Examiner—Timothy V. Eley

[57] ABSTRACT

A flowline bundle is twisted or braided into a permanent rope-like helical configuration, prior to laying the flowline bundle offshore by the reel method. Apparatus for forming the helical flowline bundle includes a pipe twist head and a series of pipe tumblers alternating with intermediate pipe supports, which apparatus rotates and translates part of a flowline bundle while simply translating the other part.

32 Claims, 9 Drawing Sheets

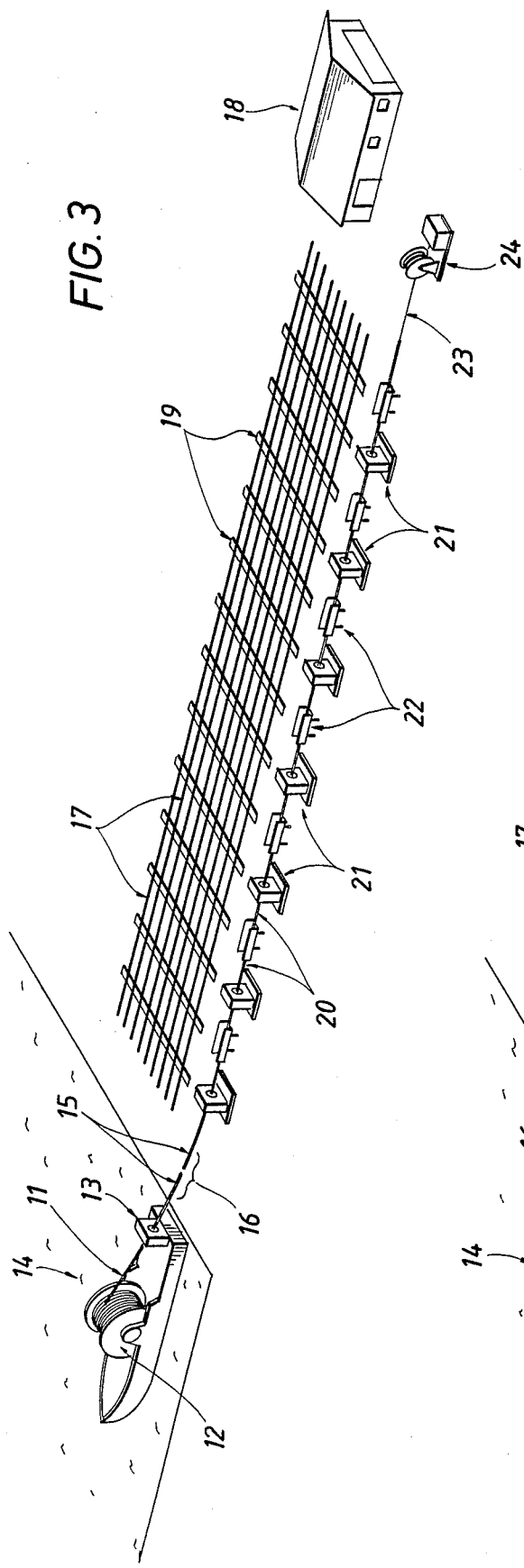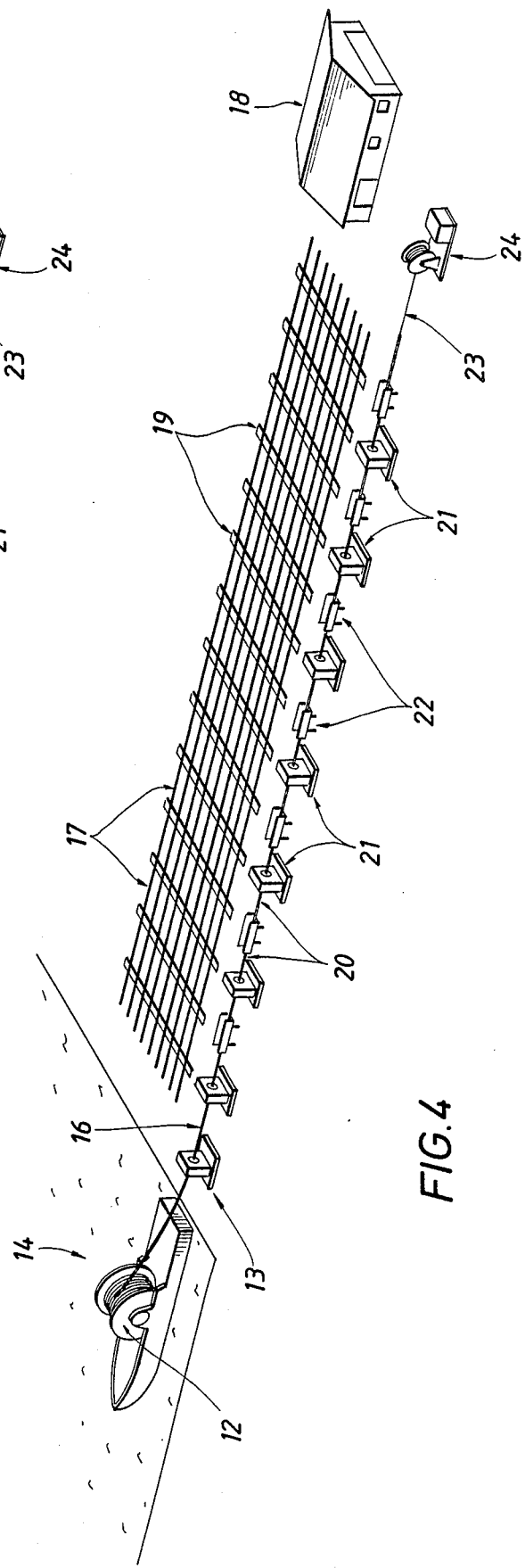

APPARATUS FOR MAKING HELICAL FLOWLINE BUNDLES

This is a continuation of application Ser. No. 889,456 filed July 25, 1986 now abandoned.

BACKGROUND OF THE INVENTION

A fast and efficient method for installing small diameter flowlines offshore is by means of reel, tensioner, and straightener devices mounted on a floating vessel. However, this "pipe reel" method becomes awkward if multiple lines must be laid simultaneously, as is often the case for flowlines laid to, or originating at, seafloor wellheads. A typical flowline bundle to such a subsea well consists of two 3-inch I.D. production flowlines, one 2-inch I.D. annulus access line, one 1-inch I.D. chemical injection line, one 1-inch I.D. hydraulic power line and one 2-inch O.D. electrical control cable. For such multiple lines it becomes necessary to spool each line onto a separate reel, and then either (1) lay each line separately off the floating vessel while carefully monitoring each suspended span, or (2) bring the separate lines together and wrap them with tape to form a "flowline bundle" which is then laid into the water as a single entity.

Problems frequently are encountered with multiple flowlines or flowline bundles as they are being laid or as they are being pulled-in and connected, either to a subsea wellhead or other subsea structure, or into a J-tube conduit on a fixed platform. Potential problems include dynamic impacts between the lines during pipelaying if laid separately. For a pull-in of a flowline bundle to a subsea wellhead or other subsea structure, potential problems include lateral buckling of the smaller lines due to bending of the bundle, overstressing of some of the lines because of non-uniform sharing of the tension and bending loads, and large torque required to orient the flowline terminal head before attaching to the wellhead. For a flowline bundle pulled into a J-tube, potential problems include increased pullforce due to composite-beam bending effect for pipes that are tightly wrapped, differential stretching or buckling of the smaller lines inside the curved portion of the J-tube, or formation of buckled pipe "loops" at the mouth of the J-tube, for bundles that are only loosely or partially wrapped. The present invention is directed toward overcoming these and other problems of the art as will be apparent hereinafter.

Relevant prior art includes an article in the Mar. 1986 Offshore Engineer, pages 38–42, entitled "Bundles offer reel advantages", and U.S. U.S. Pat. Nos. 2,832,374; 3,197,953; 3,526,086; 607,932; 4,529,334 British 676,224.

SUMMARY OF THE INVENTION

The present invention is directed to methods for fabricating flowline bundles into a helical rope-like configuration. In one preferred embodiment, the method requires assembling a first bundle of essentially parallel flowlines; twisting the first bundle into an essentially helical configuration; assembling a second bundle of essentially parallel flowlines; attaching the first (twisted) bundle to the second (untwisted) bundle with fluid-tight connections; and twisting the second bundle into an essentially helical configuration; etc. In this preferred embodiment, the bundles are twisted into a helix at a point adjacent to where the first and second bundles are attached. The twisting is accomplished by rotating and translating either the first (twisted) or second (untwisted) bundle while translating but not rotating the other. Alternatively, the second bundle, after attachment to the first bundle, may be twisted at an end opposite to where the bundles are attached. In another preferred embodiment, the method requires assembling a first bundle of essentially parallel flowlines; twisting the first bundle into an essentially helical configuration; assembling a second bundle of essentially parallel flowlines; twisting the second bundle into an essentially helical configuration; and attaching the first (twisted) bundle to the second (twisted) bundle with fluid-tight connections; etc. In this embodiment the bundles may be twisted from one or both ends.

In all cases the bundles may be reeled onto a reel, which reel may be onboard a vessel, and then may be laid offshore by unreeling while moving the vessel forward along the flowline route. Alternately, the helical flowline bundle may be assembled into one or more long strings which may then be towed into place offshore by tow vessels. In a highly preferred embodiment the parallel pipe strings to be formed into a helical bundle are supported at intervals along the lengths thereof by tumblers which rotate the pipe strings during helical twisting thereof, and the pipe strings are individually passed through orifices of a rotating twist head to produce the helical configuration of the flowline bundle.

Other purposes, advantages and features of the invention will be apparent to one skilled in the art upon review of the following.

BRIEF DESCRIPTION OF THE DRAWINGS

FIGS. 3 and 4 disclose first and second embodiments of a pipe spooling yard for fabricating and spooling helical pipe bundles.

DESCRIPTION OF PREFERRED EMBODIMENTS

This invention relates to the twisting, braiding, and/or wrapping of a flowline bundle into a permanent rope-like helical configuration, prior to laying the flowline bundle offshore, preferably by the reel method. Alternatively, the flowline may be assembled onshore and towed into place offshore without placing it upon a reel. Throughout this disclosure, the terms "twisting", "braiding", and "pipe twist head," etc., have been given the special meaning of rotating the several pipes around one another without applying substantial torque to any of the pipes, as necessary to form the pipes into a permanent rope-like helix. Thus, a line drawn along the top of each pipe in the bundle would remain at the top of each pipe throughout the "twisting" process. The only residual moment or torque left in the pipe bundle after forming this helix would be that associated with the relatively small curvature of the helix itself. This small torque, which incidentally, gives rise to the forces holding the bundle together, are easily contained and counteracted by tape wrapping means or other banding means applied to the bundle at intervals, as described below.

A flowline bundle twisted or braided into a helix offers several advantages over alternative configurations. Because of the combined weight and stiffness, and the close proximity of the various pipes, a helical bundle provides greater strength, integrity, and protection for the various pipes in the bundle than is possible if the lines are laid separately. This invention enables the spooling and laying of an entire flowline bundle as a single pipeline from a single reel, such as the large pipe reels on various existing vessels. Thus, the need for more than one reel, straightener, tensioner, and span-monitoring device on the reel vessel is eliminated. This invention also permits the handling, survey, repair, etc., of the flowline bundle as a single pipeline instead of as several separate lines, which is a significant operational advantage. Composite beam behavior is virtually eliminated for a helical flowline bundle. Thus, the stiffness of a helical bundle in bending or twisting is simply the sum of the stiffnesses of the individual pipes, which is much smaller than that of a similarly sized composite beam. Hence, the braided bundle minimizes the bending moments and torques required to align the flowline terminal head with the receptacle on a wellhead and minimizes J-tube pullforces. The braided bundle also eliminates any problems with lateral buckling of the smaller pipes due to either bending or thermal-pressure expansion, which can occur for a straight-pipe partially wrapped bundle configuration. Thus, for example, the present invention eliminates buckling problems for flowline bundles to be spooled onto a reel or to be pulled through a J-tube.

Figure 1:
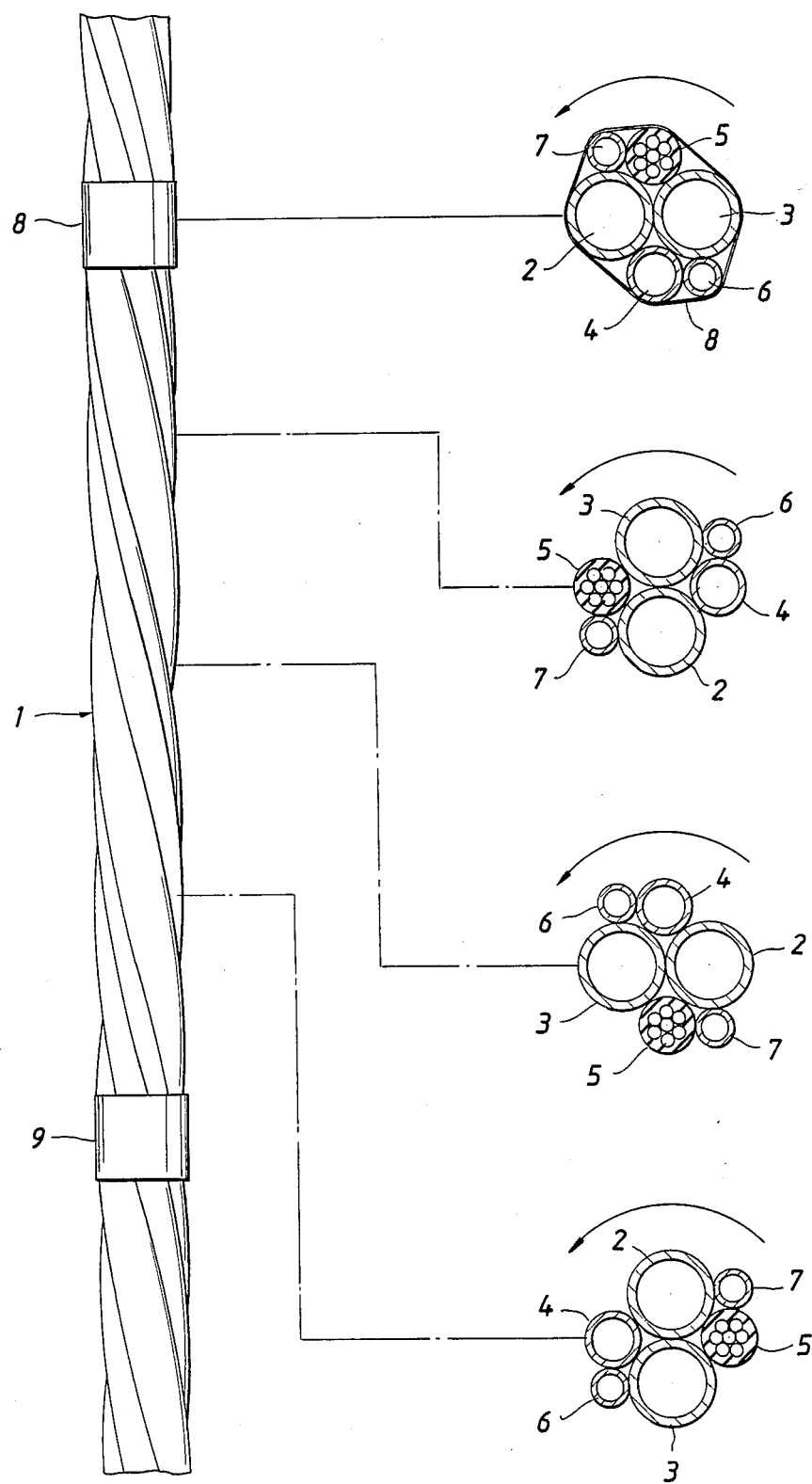
FIG. 1 shows a helical flowline bundle formed by twisting multiple pipes and cables together into a helix.

Referring now to the drawings, as shown in FIG. 1 a helical flowline bundle 1 is formed by twisting multiple pipes and cables together into a helix. The bundle may comprise, for example, two production flowlines 2 and 3, an annulus access line 4, as electrical control cable 5, a chemical injection line 6 and a hydraulic power line 7. When twisted helically together they comprise a flowline bundle 1 which is stabilized from untwisting by wrappings 8 and 9 of reinforced plastic tape or other strapping means. Experience has shown that such wrapping or strapping of a helical bundle is strictly required only at the two extreme ends of the bundle, but for safety sake may also be employed at intermediate locations.

Figure 2:
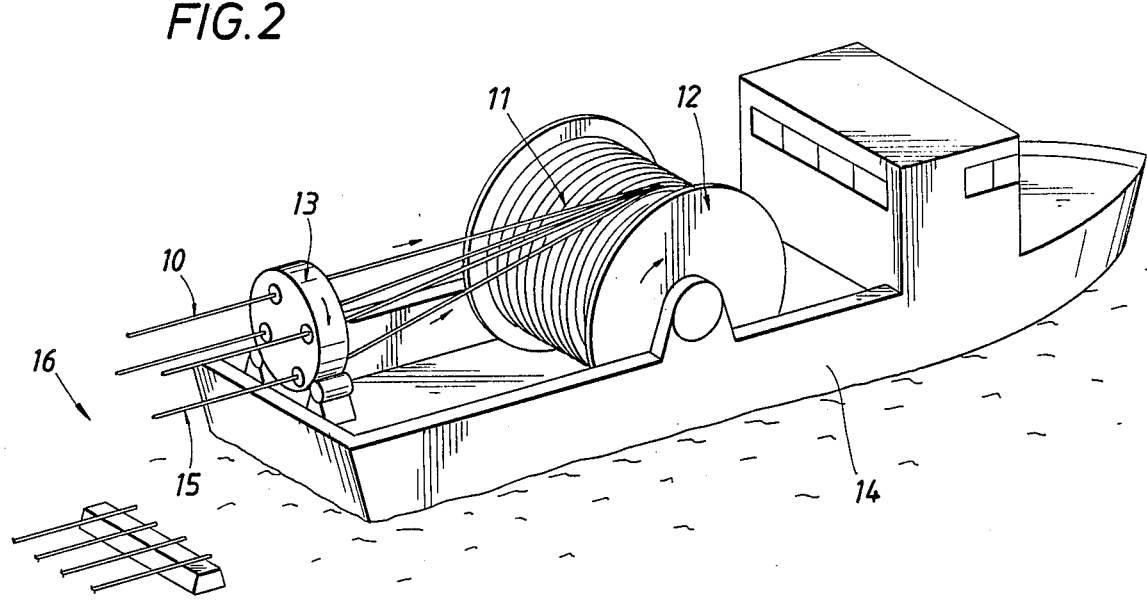
FIG. 2 discloses a flowline bundle being simultaneously twisted and spooled onto a reel vessel.

Several different methods are envisioned for forming pipes into a helical flowline bundle for laying by the reel method, etc. as illustrated in the figures of the drawings. One procedure, FIG. 2, involves forming several pipes 10 into a helix 11 simultaneously as the pipes are spooled onto a reel 12. For this procedure, a pipe twisting head 13 is required, mounted near and aligned with the reel 12, optionally located on the stern of the reel vessel 14, which applies the necesary tensions and rotations to the pipes 10 as they are fed onto the reel 12. Pipe lengths are added to the free ends 15 of the pipe bundle 11 at a pipe joining area 16 just beyond the twist head 13 from the reel 12. Where a fast-welding technique such as the homopolar or flash-butt methods is available, or if mechanical connections such as threaded pipe are used, then only short lengths need be handled during the twisting and spooling process. However, where manual welding is employed, the slower welding speed requires that the separate pipes of the bundle first be made up into long strings, and then these entire pipe strings be rotated around each other as the twisted pipe bundle is spooled onto the reel.

The rates of twisting and spooling must be carefully coordinated to achieve a uniform helix with a proper pitch length. Experience has shown that the optimum pitch length of a helical flowline bundle is 80-100 times the diameter of the largest pipe in the bundle. For a longer pitch length the pipes are too loosely bound together and tend to separate as they are bent onto the reel. For a shorter pitch length the pipes become plastically bent in the process of forming the helix, and so a straight uniform helix becomes impossible to maintain.

FIG. 3 illustrates a preferred procedure and layout of a pipe spooling yard for assembling pipe into long strings 17, then forming these pipe strings 17 into a helical bundle 11 as the bundle is spooled onto a reel 12. This procedure involves the following steps: (1) forming pipe into long strings 17 in shop 18 by welding or other means, and placing these strings onto storage rack 19; (2) loading appropriate pipe strings 20 from storage rack 19 into pipe string tumblers 21 and intermediate supports 22; (3) making tie-in connections by welding or other means, at the pipe joining area 16, between the pipe strings 20 and the free pipe ends 15 of the bundle 11 from reel 12 on vessel 14; (4) simultaneously rotating pipe strings 20 by means of pipe tumblers 21, twisting pipe strings 20 into a helix by means of twist head 13, and spooling the resulting helical bundle onto the reel 12, while adjusting feed and twist rates as required to maintain a proper helix; (5) stopping the twisting/spooling operations when the trailing ends of the pipe strings 20 reach the pipe joining area 16; (6) wrapping or banding the bundle 11 between the reel 12 and the twist head 13 to prevent unraveling; and (7) repeating steps (1) through (6) until a sufficient length of helical bundle 11 has been assembled and stored on the reel 12 for a given offshore flowline application. The tumblers 21 are preferably designed to open at the top or side to allow easy loading of the pipe strings. The rotation speed of each pipe tumbler 21 is synchronized with the twist head 13 to maintain the pipe strings 20 straight and parallel during the twisting/spooling operations. Back tension is maintained in the pipe strings primarily by friction in the twist head, tumblers, and intermediate support apparatus.

FIG. 4 illustrates another preferred procedure and layout of a pipe spooling yard that is nearly identical to FIG. 3, except that the bundle twist head 13 is located onshore instead of on reel vessel 14. Note in FIGS. 3 and 4 that a control cable or control umbilical 23 may be fed off a temporary storage reel 24 and assembled together with the pipe strings 20 as part of the helical flowline bundle 11.

Figure 5:
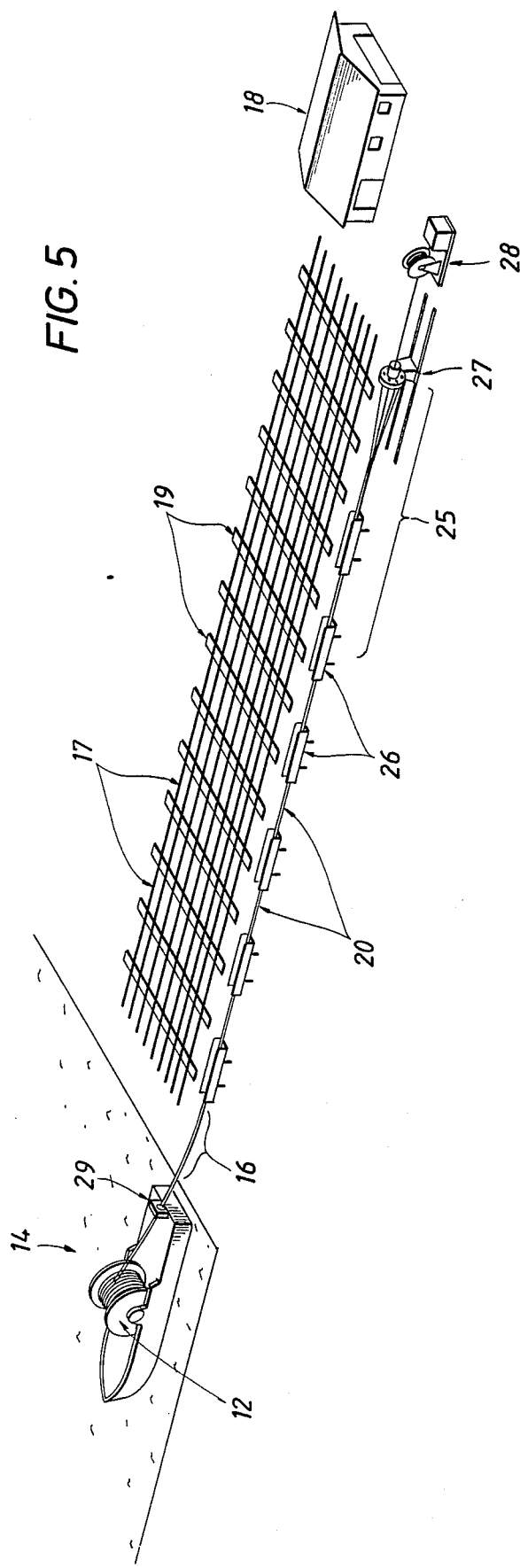

A fourth procedure, shown in FIG. 5, for forming pipes into a helical bundle for laying by a reel vessel involves the following steps: (1) fabricating pipe strings 17 in a shop 18 and storing on racks 19; (2) loading appropriate pipe strings 20 from racks 19 into bundle assembly/twist area 25, which comprises a series of supports 26 (preferably having rollers to allow free movement of the bundle); (3) connecting pipe strings 20 at the pipe joining area 16 to pipe ends emanating from the pipe bundle already on the reel 12; (4) connecting other ends of pipe strings 20 to a pipe twist head 27 located at the far end of the assembly/twist area 25; (5) twisting pipe strings 20 on supports 26 into a specified helix by rotating and applying tension to the pipe strings by means of the twist head 27 and winch 28; (6) taping or banding the pipe strings together at the far end to prevent unraveling; (7) releasing pipe bundle 20 from twist head 27 and from clamp 29 on reel vessel 14; (8) spooling pipe bundle 20 onto reel 12 while maintaining sufficient back tension with winch 28; and (9) clamping pipe bundle 20 in clamp 29 on reel vessel 14 while leaving sufficient lengths of free pipe ends for welding onto the next pipe strings. These steps (1) through (9) are repeated until a sufficient length of pipe bundle is stored on reel 12.

Figure 6:
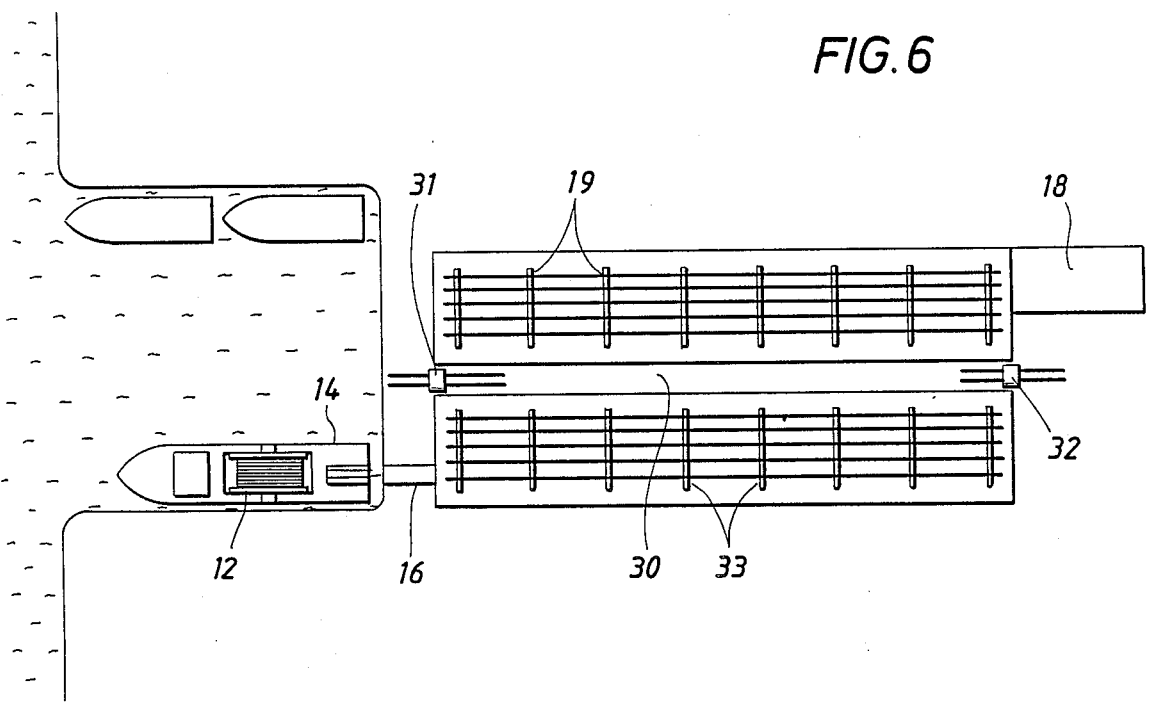
FIGS. 5 and 6 disclose third and fourth embodiments of a layout of a pipe spooling yard.
Figure 7:
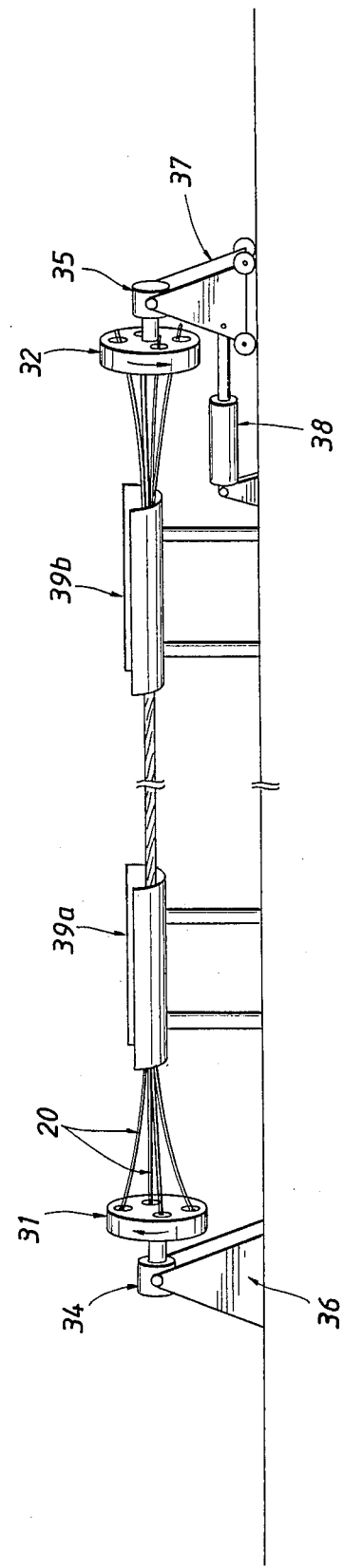
FIG. 7 shows a double twist head arrangement for forming helical bundles prior to being spooled onto a reel vessel.

A fifth procedure for forming pipes into helical bundles for laying by a reel vessel is indicated in FIGS. 6 and 7. This procedure involves first forming individual pipe strings into helical bundle segments and then later joining these helical strings to pipe already on the reel and spooling these helical strings onto the reel. The procedure involves: (1) fabricating pipe strings 17 in shop 18 and storing on racks 19, as before; (2) loading appropriate pipe strings 20 from racks 19 into a central bundle assembly/twist area 30; (3) connecting pipe strings 20 to pipe twist heads 31 and 32 at each end of the assembly/twist area 30; (4) twisting pipe strings 20 into a specified helix by rotating and applying tension to the pipe strings by means of the two twist heads 31 and 32; (5) taping or banding the pipe strings together at each end to prevent unraveling; (6) releasing the helical pipe bundle segment 20a from twist heads 31, 32, then placing this bundle segment 20a on pipe bundle storage rack 33; and (7) repeating steps (1) through (6) until a sufficient total length of twisted bundle segments for a given offshore flowline application has been produced and stored on rack 33. At a convenient later time these helical bundle segments may be connected sequentially at pipe joining area 16 and spooled onto reel 12 of vessel 14. Finally, reel vessel 14 proceeds offshore to lay this flowline bundle.

FIG. 7 illustrates in more detail the apparatus for twisting helical bundle segments from both ends. For this process two pipe twist heads 31 and 32, driven by motors 34 and 35, are located at each end of the bundle assembly/twist area 30, twist head 31 being mounted on a stationary fixed support 36 and twist head 32 being mounted on a trolley 37 with means 38 (e.g., a pneumatic cylinder) to apply tension to the pipe strings 20 as they are braided together. The assembly/twist area 30 itself comprises a series of pipe supports 39a, 39b, etc., preferably having rollers to allow free movement of the bundle during the twisting process. For any helical pipe bundling process that involves twisting pipe strings from one or both ends, as illustrated in FIGS. 5–7, in order to produce a uniform helix additional friction reduction means (e.g., lubricants or rollers) will have to be introduced between the various pipes of the bundle prior to and during the twisting operation.

Figure 8:
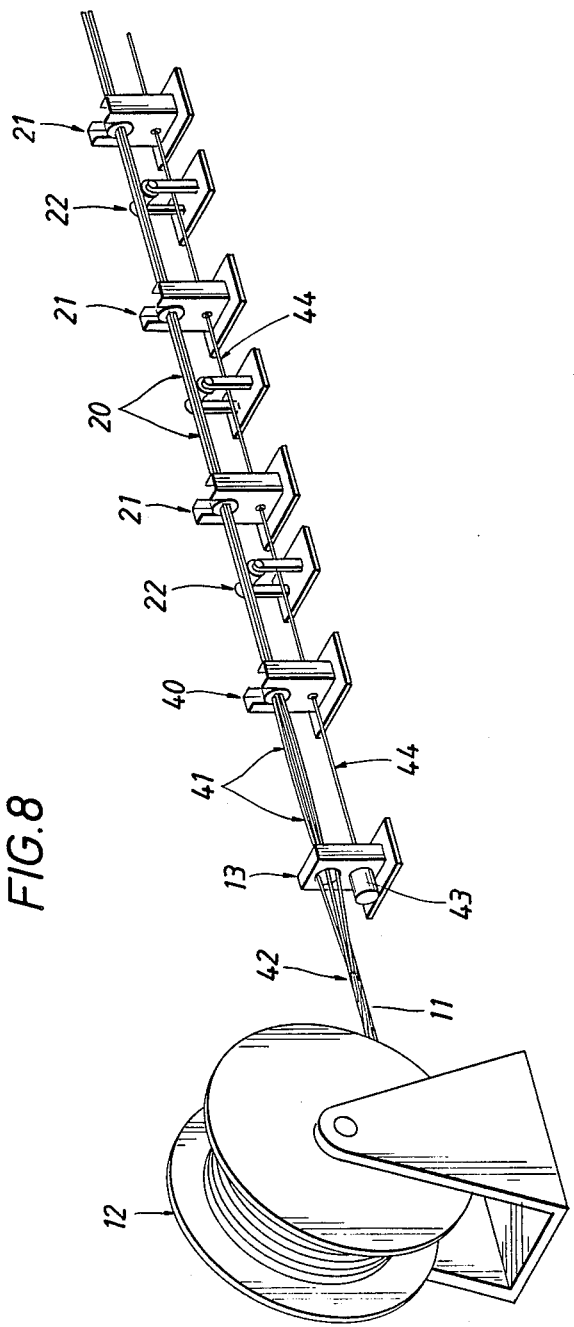
FIGS. 8 and 9 disclose particulars of the arrangement and connections between a pipe twist head and a sequence of pipe tumblers and intermediate bundle supports.
Figure 9:
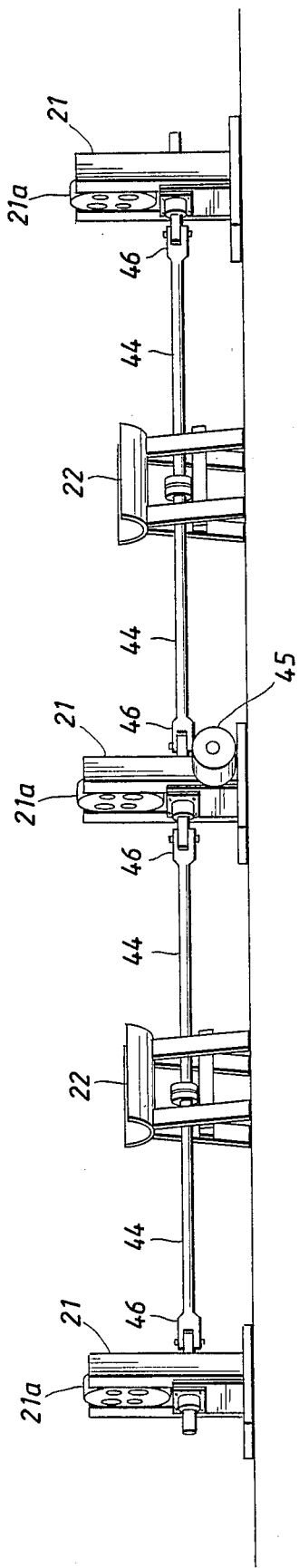

FIGS. 8–13 disclose in more detail apparatus for twisting and spooling flowline bundles onto a pipe storage reel, which apparatus corresponds with the preferred procedure of FIGS. 3 and 4. Referring to FIG. 8, straight pipe strings 20 to be twisted are passed through a series of pipe tumblers 21 which alternate with intermediate pipe supports 22, then through a special large disk tumbler 40, and finally through a pipe twist head 13. Rotation of the disk elements of each of these machines 21, 40, 13, causes the parallel pipe strings 20 to rotate around one another as they move toward the reel 12. As the pipe proceeds from the large disk tumbler 40 through the twist head 13, the parallel pipe strings tend to bow out at a point 41 and then focus together at a point 42 where the helical bundle becomes fully formed, after which the helical flowline bundle 11 translates but does not rotate until it reaches the reel 12 upon which it is spooled. A variable speed motor 43 is utilized to drive the twist head 13, and, by turning a series of drive shafts 44, the various pipe tumblers 40, 21, are turned in synchronization with the pipe twist head 13. Alternatively, one or more pipe tumblers 21, 40 may be powered by individual electric or hydraulic motors, which are maintained in synchronous rotation with the twist head 13 by an electronic control system or other means. FIG. 9 illustrates, for example, a scheme whereby three consecutive pipe tumblers 21 are powered by a separate drive motor 45, through worm gears (not shown) and drive shafts 44, which motor 45 is synchronized with the twist head (not shown) by electronic controls or other means. FIG. 9 also illustrates an alternative type of intermediate pipe support 22 in the form of a trough, and coupling means 46 between the drive shafts 44 and the tumblers 21.

Figure 10A:
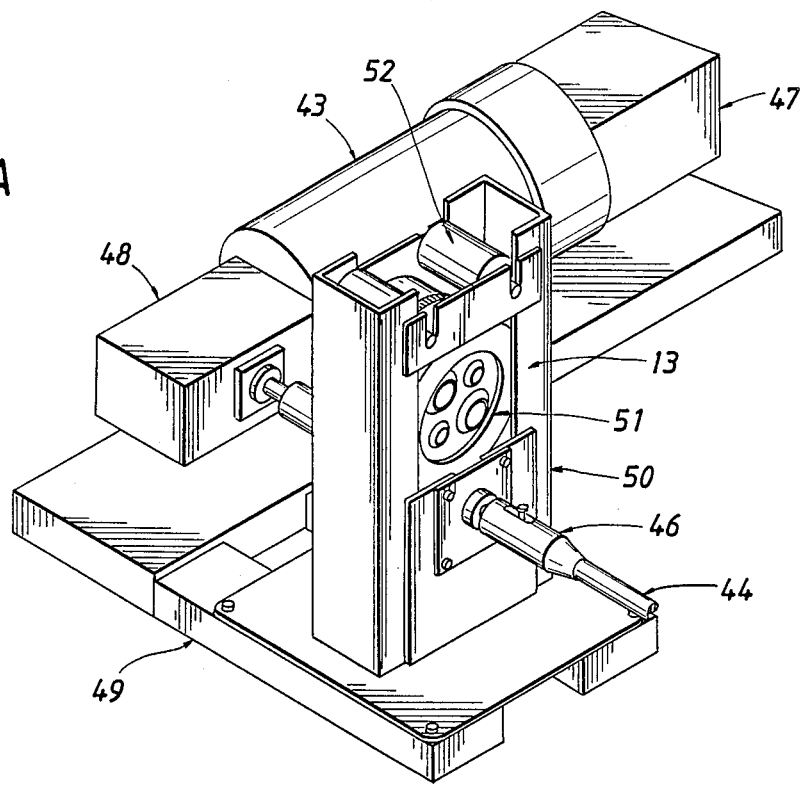
FIGS. 10a-10b and 11a-11c show mechanical details of a pipe twist head apparatus including two designs of a pipe twist head disk.
Figure 10B:
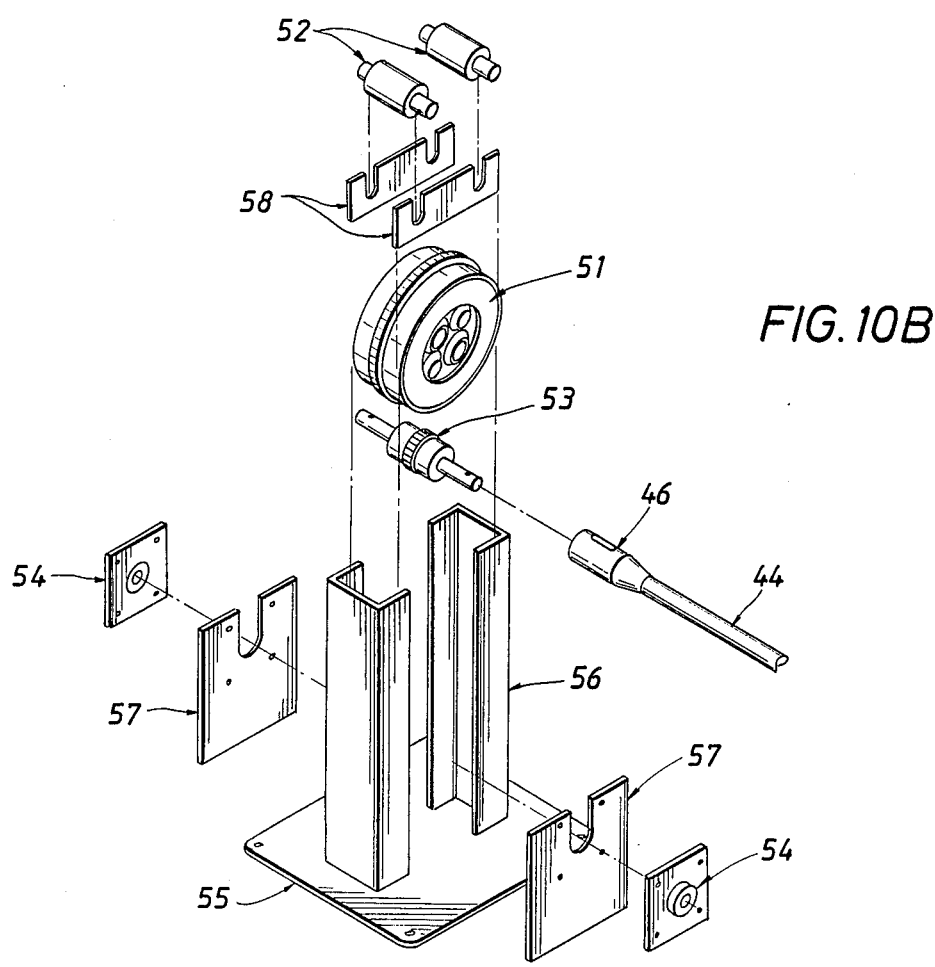
Figure 11A:
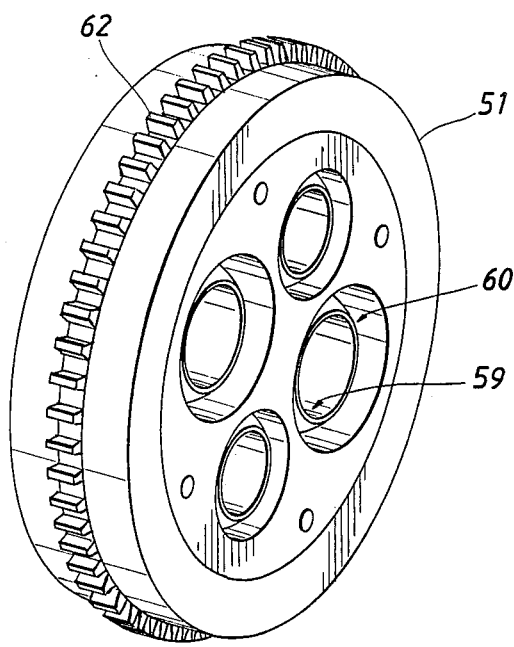
Figure 11B:
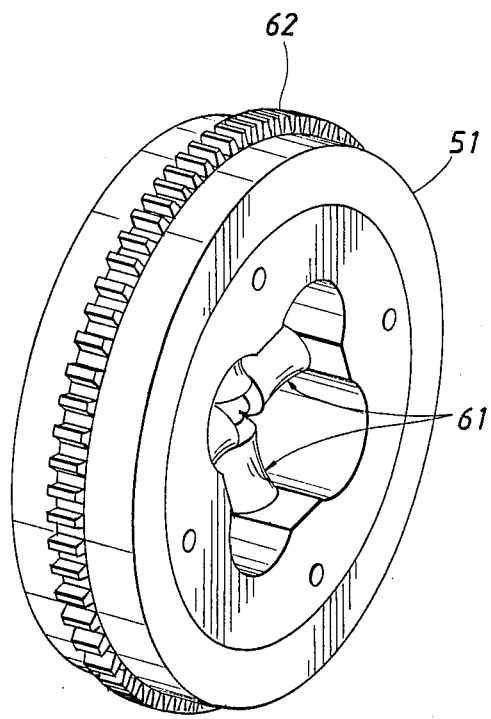
Figure 11C:
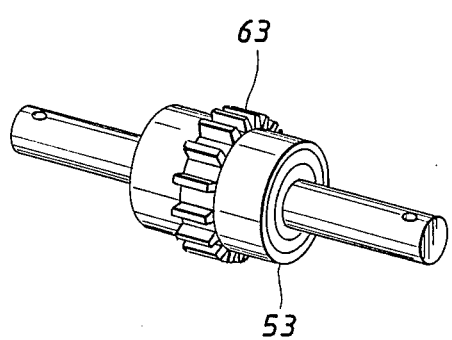

FIGS. 10a and 10b illustrate mechanical details of a pipe twist head assembly. Pipe twist head 13 and drive motor 43, together with speed control 47 and speed reduction gear box 48, are mounted on a structural base 49, which preferably is anchored to a solid foundation. Twist head 13 itself comprises a frame 50, twist head disk 51, hold-down rollers 52, drive pinion 53, and drive bearings 54. Frame 50 comprises base plate 55, side members 56, end plates 57, and roller support plates 58, all welded together. Also shown in FIGS. 10a, 10b, are drive shaft 44 and coupling 46. FIGS. 11a and 11b show in greater detail two designs for a twist head disk 51, which guides and rotates the flowlines (not shown) as they are being twisted into a helical bundle. In one design (FIG. 11a) the flowlines are guided through the inner cylindrical surfaces 59 of two or more spherical bearings 60 which are embedded in the disk 51. In a second design (FIG. 11b) the flowlines are guided through orifices containing two or more rollers 61 whose shafts (not shown) are embedded in the disk. The disks shown in FIGS. 11a, 11b, each contain four orifices for twisting up to four flowlines. Other twist head disk designs, having various numbers of orifices and/or different pipe support features, are also possible. Also embedded in the twist head disk 51 is gear 62 which meshes with gear 63 of drive pinion 53, shown in FIG. 11c, to provide necessary slip-free rotation of the disk 51.

Figure 12A:
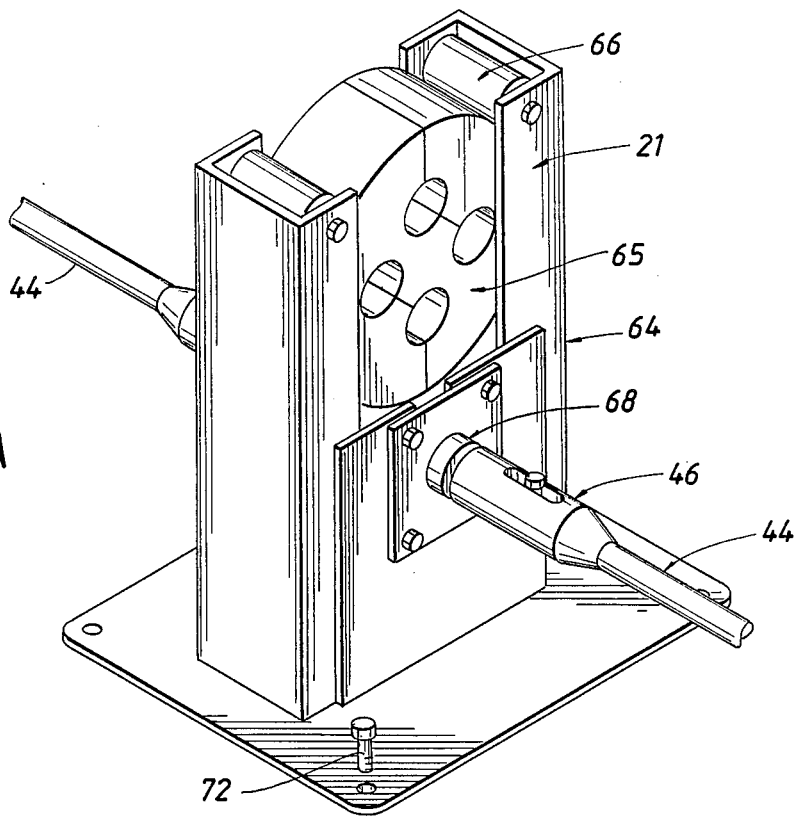
FIGS. 12a, 12b, 13a and 13b show mechanical details of a pipe tumbler apparatus including two designs of a pipe tumbler disk.
Figure 12B:
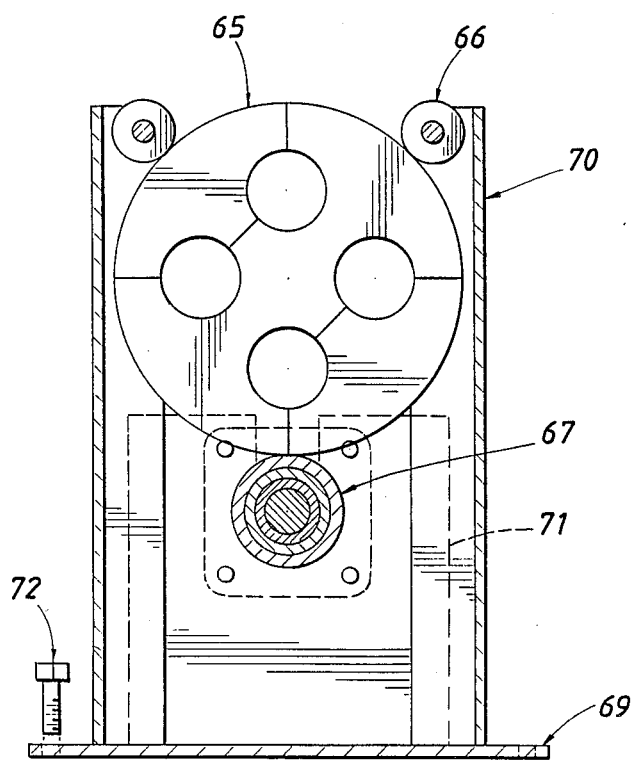
Figure 13A:
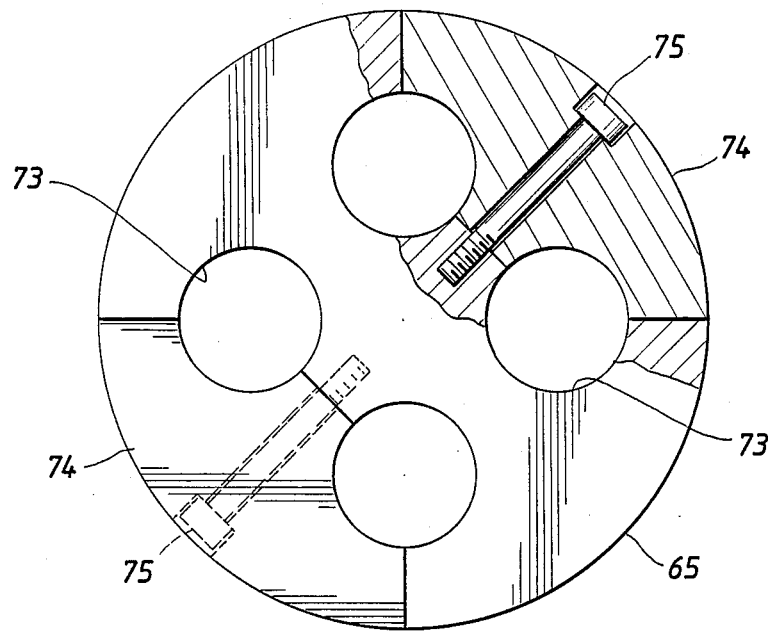
Figure 13B:
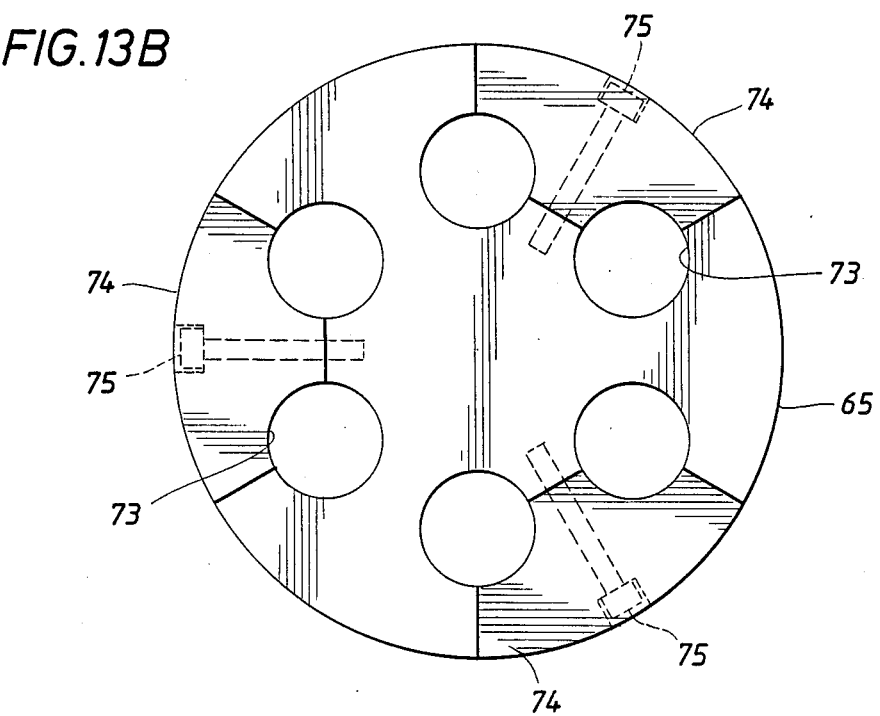

FIGS. 12a and 12b illustrate mechanical details of a pipe tumbler assembly. Pipe tumbler 21 consists of frame 64, tumbler disk 65, hold-down rollers 66, drive pinion 67, and drive bearings 68. Frame 64 comprises base plate 69, side members 70, and end plates 71, all welded together. Base plate 69 preferably is anchored to a solid foundation and may contain screws 72 for leveling. Drive pinion 67 may be coated with a high-friction surface (e.g. rubber), or meshing gears may be embedded in both drive pinion 67 and tumbler disk 65, to provide necessary slip-free rotation of the disk 65. FIGS. 13a and 13b depict in greater detail two designs for a tumbler disk 65, which guides and rotates the parallel flowlines (not shown) which eventually are twisted into a helix (see FIG. 8). One tumbler disk (FIG. 13a) has four orifices 73 to simultaneously rotate up to four flowlines, whereas the other disk (FIG. 13b) has six orifices 73 which can rotate up to six flowlines, Both disks 65 can be opened by removal of pieces 74, which are held in place by recessed screws 75, to allow easy top- or side-loading of the flowlines. Other tumbler disk designs, having various numbers of orifices and/or different quick-opening features for loading of the flowlines, are also possible.

The pitch length of the helix for the flowline bundles described herein is preferably equal to or less than the minimal circumference of a reel or J-tube to which the bundle will be bent, in order to avoid problems with differential buckling or stretching of the several pipes. Thus, for a helical bundle to be laid from the reel ship Apache, the normal pitch length is preferably equal to or less than 160 feet, which is the circumference of the main reel. For any flowline bundle twisting procedure in which the twisting process must be halted, the bundle removed from the twisting apparatus, and the process later started up again, and in particular for the procedure of FIGS. 5 and 6, described above, a short length at the end of each twisted pipe string is preferably specially twisted and temporarily banded into a tighter helix than normal. Once this pipe string has been joined to the pipe already on the reel, the temporary banding is preferably released, thus forming a uniform helix across the entire pipe bundle including the sections of pipe containing the joints between the pipe strings.

The foregoing description of the invention is merely intended to be explanatory thereof, and various changes in the details of the described method and apparatus may be made within the scope of the appended claims without departing from the spirit of the invention.

What is claimed is:

1. An apparatus for fabricating a helical flowline bundle comprising:
    means for assembling a first bundle of essentially parallel flowlines;
    first means for twisting the first bundle into an essentially torque-free helical configuration;
    means for assembling a second bundle of essentially parallel flowlines;
    means for attaching the first bundle to the second bundle with fluid-tight connections; and
    second means for twisting the second bundle into an essentially torque-free helical configuration.

2. The apparatus of claim 1 wherein the first and second means for twisting the bundles into a helix are the same and are at a point adjacent to where the first and second bundles are attached.

3. The apparatus of claim 1 wherein the second means for twisting the second bundle is at an end opposite to where the bundles are attached.

4. The apparatus of claim 1 including means for reeling the helical bundle onto a reel.

5. The apparatus of claim 4 wherein the reel is on-board a vessel and the means for twisting the bundles into helical configurations are on the vessel.

6. The apparatus of claim 4 wherein the reel is onboard a vessel and the means for twisting the bundles into helical configurations are onshore and adjacent the vessel.

7. The apparatus of claim 1 including means for supporting the bundles at intervals along the lengths thereof by tumblers which are functional to rotate the bundles during helical twisting thereof.

8. The apparatus of claim 1 including means for passing the flowlines individually through orifices of a rotating twist head to produce helical alignment of the flowlines.

9. The apparatus of claim 8 including means for supporting the bundles at intervals along the lengths thereof by tumblers which rotate the bundles at the same rate and direction as the twist head.

10. The apparatus of claim 9 including means for accomplishing synchronous rotation of the twist head and pipe tumblers by a single drive motor and a series of drive shafts passing between the twist head, pipe tumblers and single drive motor.

11. The apparatus of claim 9 including means for accomplishing the synchronous rotation of the twist head and pipe tumblers by at least two drive motors having controlled and synchronized speeds.

12. The apparatus of claim 9 including means for controlling the rotation speed of the twist head and the pipe tumblers in relation to the translational speed of the flowline bundle to maintain uniform helical configuration throughout the pipe bundle.

13. The apparatus of claim 12 including means for maintaining the pitch length of the flowline bundle helix between 80 and 100 times the diameter of the largest pipe in the bundle.

14. The apparatus of claim 1 wherein the means for twisting the flowline bundles comprises:
    a pipe twist head assembly;
    a series of pipe tumbler assemblies;
    a series of intermediate bundle supports; and
    at least one adjustable-speed drive motor adapted to drive the pipe twist head and pipe tumbler assemblies.

15. The apparatus of claim 14 wherein the pipe twist head is located at one end of a bundle assemblyway, and the pipe tumblers are spaced out along the assemblyway, with one or more intermediate bundle supports located between each pair of pipe tumblers.

16. The apparatus of claim 14 wherein the pipe twist head is directly drivable by an adjustable-speed motor and wherein the pipe tumblers are indirectly drivable through a series of drive shafts connected between each pair of machines.

17. The apparatus of claim 14 wherein the pipe twist head and pipe tumblers are drivable by at least two adjustable-speed motors having controlled and synchronized speeds.

18. The apparatus of claim 14 wherein the pipe twist head assembly comprises:
    a frame;
    a twist head disk;
    a drive pinion;
    drive shaft bearings;
    hold-down rollers; and
    couplings to connect with a drive motor and drive shaft.

19. The apparatus of claim 18 wherein the twist head disk is supported between the frame, the drive pinion, and the hold-down rollers, and is rotatable in an opposite direction to the drive pinion.

20. The apparatus of claim 19 wherein the relative rotation between the twist head disk and the drive pinion is slip-free by virtue of at least one of a friction coating on the drive pinion and gears embedded in both the disk and the drive pinion.

21. The apparatus of claim 18 wherein the twist head disk contains at least two orifices which permit free longitudinal movements, free torsional movements, and relatively free angular movements, of the individual flowlines of the bundle while operative to impart to the flowlines the rotational motion of the disk.

22. The apparatus of claim 21 wherein the orifices of the twist head disk comprise the inner cylindrical surfaces of at least two spherical bearings embedded in the disk.

23. The apparatus of claim 21 wherein the orifices of the twist head disk are at least two longitudinal holes cut through the disk, of sufficient size and contour to permit free movement of the flowlines.

24. The apparatus of claim 23 wherein the orifices are surrounded by rollers placed to reduce friction and wear loads on the flowline bundle.

25. The apparatus of claim 14 wherein each pipe tumbler assembly comprises:
 a frame;
 a tumbler disk;
 a drive pinion;
 drive shaft bearings;
 hold-down rollers; and
 couplings to connect with at least one of a drive motor and a drive shaft.

26. The apparatus of claim 25 wherein the tumbler disk is supported between the frame, the drive pinion, and the hold-down rollers, and is rotatable in an opposite direction to the drive pinion.

27. The apparatus of claim 26 wherein the relative rotation between the tumbler disk and the drive pinion is slip-free by virtue of at least one of a friction coating on the drive pinion and gears embedded in both the disk and the drive pinion.

28. The apparatus of claim 25 wherein the tumbler disk contains at least two orifices which permit free longitudinal and free torsional movements of the individual flowlines of the bundle, while operative to impart to the flowlines the rotational motion of the disk.

29. The apparatus of claim 28 wherein the orifices of the tumbler disk are at least two longitudinal holes through the disk, of sufficient size and contour to permit free movements of the flowlines.

30. The apparatus of claim 29 wherein the orifices are surrounded by rollers placed to reduce the friction and wear loads on the flowline bundle.

31. The apparatus of claim 28 wherein the orifices of the tumbler disk are functional to open to provide access to the outside of the disk, through removal of at least one of the pieces of the disk.

32. The apparatus of claim 14 wherein the intermediate bundle supports comprises at least one of a trough made of soft material and rollers arranged in such configuration that the flowline bundle is supported without coating damage between the pipe tumblers.

* * * * *